(12) United States Patent
Dubeyko et al.

(10) Patent No.: US 12,182,065 B2
(45) Date of Patent: Dec. 31, 2024

(54) PERFORMANCE OF FILE SYSTEM OPERATIONS

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/133,263

(22) Filed: Apr. 11, 2023

(65) Prior Publication Data

US 2023/0244635 A1    Aug. 3, 2023

(51) Int. Cl.
| | |
|---|---|
| G06F 7/00 | (2006.01) |
| G06F 16/11 | (2019.01) |
| G06F 16/17 | (2019.01) |
| G06F 16/172 | (2019.01) |
| G06F 16/174 | (2019.01) |
| G06F 16/178 | (2019.01) |

(52) U.S. Cl.
CPC .......... *G06F 16/122* (2019.01); *G06F 16/172* (2019.01); *G06F 16/1734* (2019.01); *G06F 16/1744* (2019.01); *G06F 16/178* (2019.01)

(58) Field of Classification Search
CPC .. G06F 16/122; G06F 16/1744; G06F 16/178; G06F 16/172; G06F 16/1734; G06F 16/2379; G06F 3/067; G06F 3/0647; G06F 3/0617; G06F 3/0664; G06F 3/0679; G06F 3/0656
See application file for complete search history.

(56) References Cited

U.S. PATENT DOCUMENTS

| | | | |
|---|---|---|---|
| 2012/0109895 A1* | 5/2012 | Zwilling | G06F 16/2308 707/648 |
| 2012/0254120 A1* | 10/2012 | Fang | G06F 16/2379 707/648 |
| 2012/0284587 A1* | 11/2012 | Yu | G06F 12/0868 711/E12.008 |
| 2014/0233376 A1* | 8/2014 | Yu | H04W 28/06 370/230 |
| 2018/0006896 A1* | 1/2018 | MacNamara | G06F 3/0647 |
| 2024/0004798 A1* | 1/2024 | Shveidel | G06F 12/0891 |

* cited by examiner

*Primary Examiner* — Mohammad A Sana
(74) *Attorney, Agent, or Firm* — BakerHostetler

(57) ABSTRACT

Techniques for improving performance of file system operations are provided. Dirty memory pages may be copied from a file system into a memory associated with a first hardware accelerator. Content of the memory pages may be compressed by one or more cores of the hardware accelerator. The compressed data may be compacted into a payload area of at least one log. Metadata of the at least one log may be prepared by the one or more cores of the hardware accelerator. The at least one log may be flushed into a storage device. A read operation may be performed on the at least one log. On a read path, in response to determining that a size of data from a plurality of logs is greater than a predetermined threshold, a new log may be created by combining the data using compression by a second hardware accelerator.

17 Claims, 16 Drawing Sheets

PERFORMANCE OF FILE SYSTEM OPERATIONS

BACKGROUND

Companies and/or individuals are increasingly utilizing and/or producing a large quantity of data. Such data may need to be collected and translated into usable information (e.g., processed). Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

The central processing unit (CPU) based model of calculation represents one of the key obstacles to enhancing the performance of data processing (e.g., calculations). The CPU-based model of calculation requires moving data and/or code from persistent memory into dynamic random-access memory (DRAM), and from DRAM into one or more CPU cache(s). Calculation may be executed by means of sharing one or more CPU core(s) amongst multiple threads of execution. However, this computation paradigm introduces a significant number of drawbacks that prevent improving computation performance. For example, this computation paradigm may cause problems with cache coherence, memory wall, and data moving.

Figure 1:
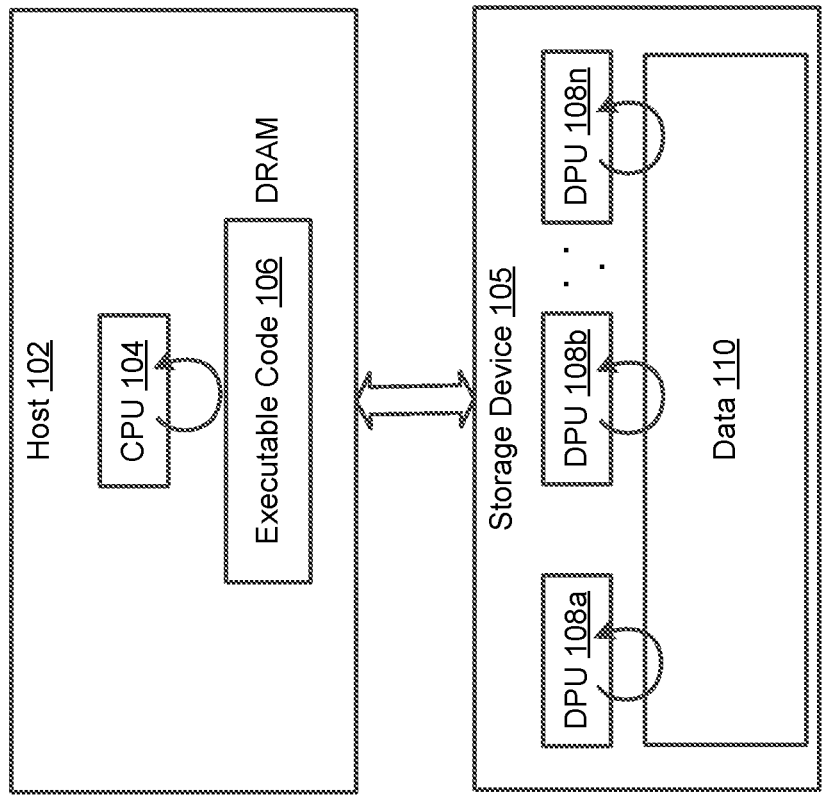
FIG. 1 shows an example framework for offloading data processing to computational storage device in accordance with the present disclosure.

To address the drawbacks introduced by the CPU based model of calculation, computation may be offloaded into data storage space. FIG. 1 shows an example framework 100 for offloading data processing in accordance with the present disclosure. The framework 100 may comprise a host 102 and a storage device 105. The host 102 may comprise one or more CPUs (e.g., CPU cores) 104. The storage device 105 may comprise a plurality of data processing units (DPUs) 108a-n. Computational storage devices, e.g., the storage device 105, may process data 110 on the storage device side.

Any algorithm may be stored into persistent memory as an executable file. The logic of data processing may already be stored in the storage device 105. The plurality of DPUs 108a-n may execute the logic to process the data 110. In embodiments, it may be possible to compile code for the DPU platform and/or to use a just-in-time (JIT) compiler approach. In other embodiments, the logic of data processing may be implemented by means of FPGA-based cores. The CPU(s) 104 may need to start, manage, and/or orchestrate activities of the plurality of DPUs 108a-n in the storage device 105.

Figure 2:
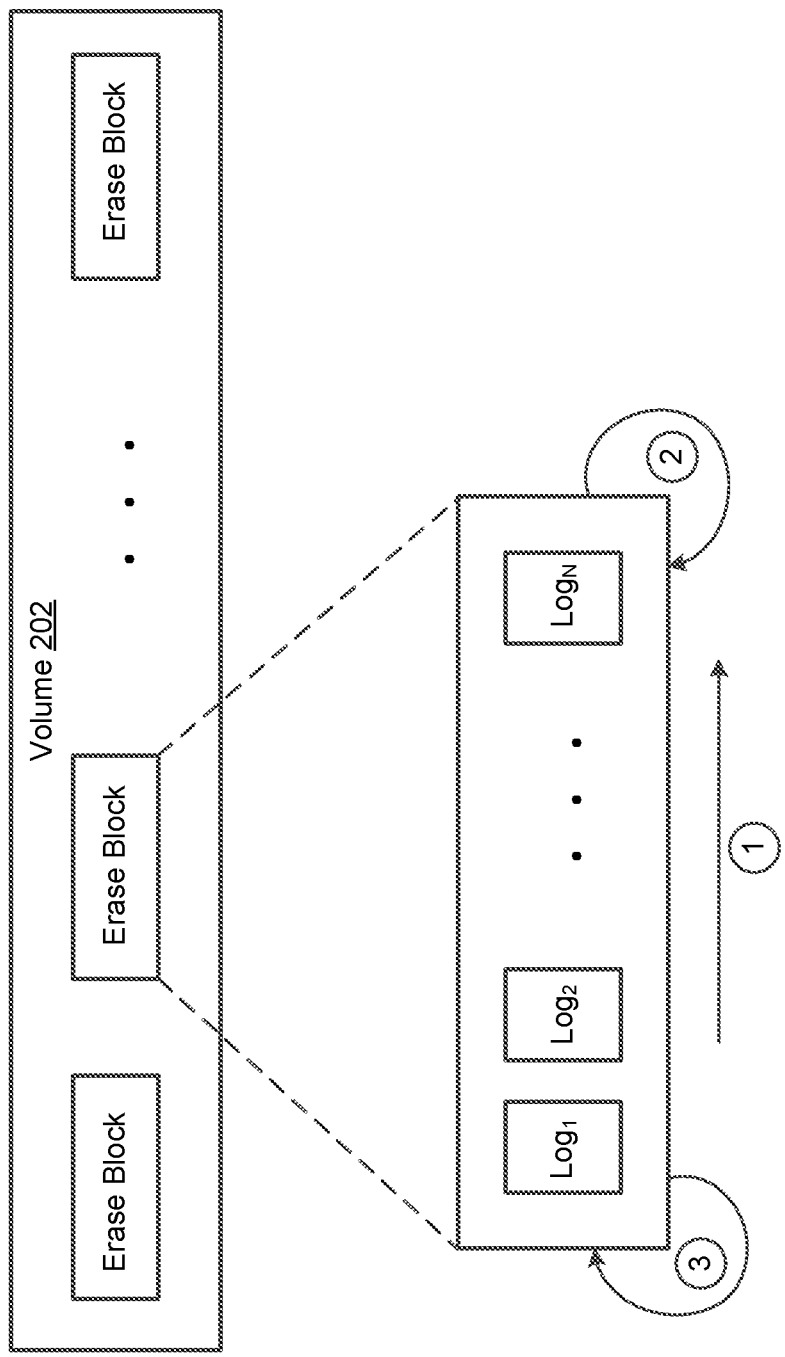
FIG. 2 shows an example log-structured file system (LFS) in accordance with the present disclosure.

FIG. 2 shows an example log-structured file system (LFS) 200. The LFS 200 comprises a file system volume 202. The file system volume 202 comprises a plurality of erase blocks. The plurality of erase blocks may be configured to store logs. Each of the plurality of erase blocks may be configured to store a sequence of logs. A log may be stored in a contiguous sequence of physical sectors (e.g., a 128K log may be stored in a sequence of 32 physical sectors of 4K each). A log among the sequence of logs may comprise a fixed-sized or variable-sized portion of data that includes metadata (e.g., a header and/or footer) and user data as payload. At numeral 1, write or update operations may be performed in an append-only manner. The LFS 200 may be flash-friendly from a write point of view.

Update operations may invalidate or render obsolete user data in old logs. At numeral 2, garbage collection (GC) operations may be required to move valid data from one or more erase blocks (e.g., exhausted erase blocks) into one or more clean erase blocks. If an erase block is completely full, then the whole block may need to be erased to perform any new write operation. Before the whole block is erased, the GC operations may move valid data from the exhausted erase block into a clean erase block. The clean erase block may store valid data in the form of logs.

Further, read operations may be required to read the log to extract data from payload. The log's payload may contain as user data as the file system's metadata. If compression or delta-encoding has been used on the user data, then the read operation(s) may require a significant amount of read operations on payload/metadata of multiple logs and computation to prepare the actual state of the requested user data by means of delta-decoding operations(s). Log preparation and parsing may be offloaded into one or more hardware accelerators to increase the performance of the file system metadata operations.

The plurality of erase blocks may be processed, e.g., read operations, in parallel and independently from each other. Delta-encoding may be used to store user data and/or metadata. Thus, delta-encoding and delta-decoding acceleration may help improve the performance of operations for user data and/or metadata. As metadata operations may be a significant portion of any file system operations, improving the performance of metadata operations may significantly improve the performance of file system operations. At numeral 3, an erase block may be erased. After valid data are moved from an erase block into another one, the erase block may be erased. If the erase block is erased, write or update operations may be performed in an append-only manner again.

Figure 3:
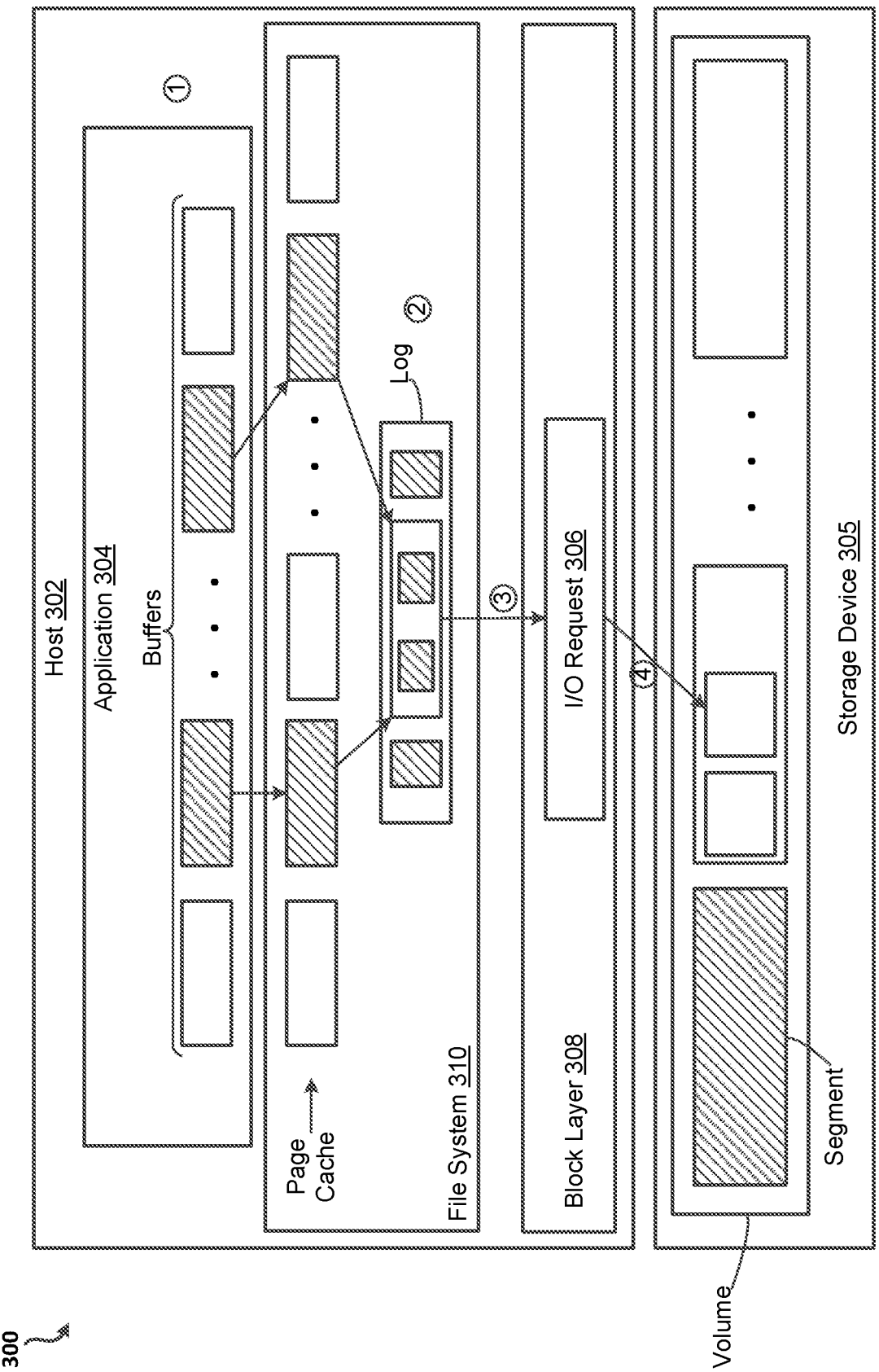
FIG. 3 shows an example LFS write path in accordance with the present disclosure.

FIG. 3 shows an example LFS write path 300. A host 302 may comprise an application 304, a file system (e.g., file system driver) 310, and a block layer 308. The host 302 may comprise at least one CPU and at least one DRAM module. The application 304 may be stored in DRAM memory during execution and the CPU(s) may be configured to execute the instruction sequence associated with the application 304. The application 304 may read or pre-fetch file content into one or more internal buffer(s) associated with the application 304. At numeral 1, the application 304 may update or modify the content in the internal buffer(s). The application 304 may also create a new file and fill it with data. Thus, the internal buffer(s) may comprise one or more dirty buffers that need to be stored or flushed into the storage device 305.

The application 304 may issue one or more write request (s). The write request(s) may modify the memory pages of a page cache in the file system 310. Then, the file system 310 may receive a write_page( ) request for dirty memory pages. At numeral 2, the file system 310 may process the write_page( ) requests by preparing one or more logs. The file system 310 may combine several write requests into a single log. Preparing each of the one or more logs may comprise preparing a log header. Preparing each of the one or more logs may comprise compressing, compacting, and preparing each log's payload. Preparing each of the one or more logs may comprise preparing a log footer. Log preparation may comprise compression, delta-encoding, and/or deduplication, which are compute-intensive operations. At numeral 3, the file system 310 may issue an I/O request 306. The I/O request may be received at the block layer 308. The file system 310 may issue the I/O request to store the prepared log into a persistent memory of the storage device 305. The block layer 308, may flush the prepared log into the persistent memory of the storage device 305. At numeral 4, the log may be made persistent. The log may be made persistent by flushing (e.g., storing) the prepared log into the persistent memory of the storage device 305.

In embodiments, the compression, delta encoding, and/or deduplication operations may be offloaded into one or more hardware accelerators. The entire log preparation operation may be executed by the hardware accelerator(s). The performance of file system operations may be enhanced by offloading the log preparation to the hardware accelerator(s). Further, logs of various erase blocks may be prepared in parallel. The hardware accelerator(s) may be configured on a host side and/or a storage device side. Such techniques for enhancing the performance of file system operations on the write path are described in more detail below.

Figure 4:
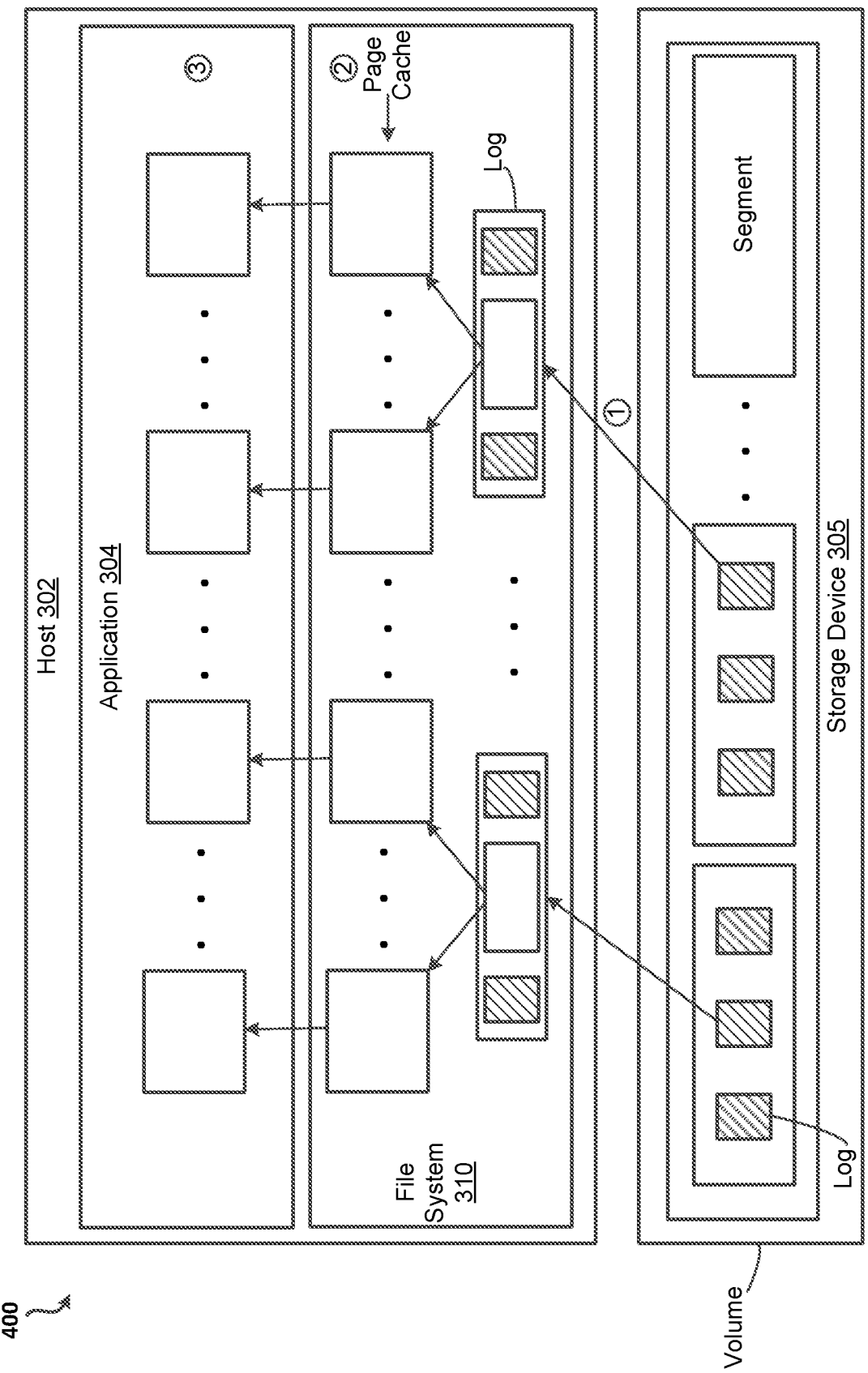
FIG. 4 shows an example LFS read path in accordance with the present disclosure.

FIG. 4 shows an example LFS read path 400. If some data has been stored into the persistent memory of the storage device 305, then the application 304 may need to read or pre-fetch stored data. The file system 310 may store all data in the form of logs on the volume. Thus, the file system 310 may, at numeral 1, read the log(s). At numeral 2, the file system 310 may parse the log(s). Parsing the log(s) may comprise preparing the page cache in the file system 310. At numeral 3, the data requested by the application may be retrieved. Retrieving the requested data from the log(s) may comprise reading the data into the internal buffer(s) of the application 304.

If the file system 310 needs to retrieve a 4 KB piece of data, then the file system 310 may need to read one or several logs partially or completely. In embodiments, the file system 310 may need to read more data from the volume (e.g., 16K) to extract the 4K piece of data. Further, the read operation may comprise decompression or/and delta-decoding operations. Thus, hardware accelerator on the storage device side may help to improve performance of file system operations on the read path.

Figure 5:
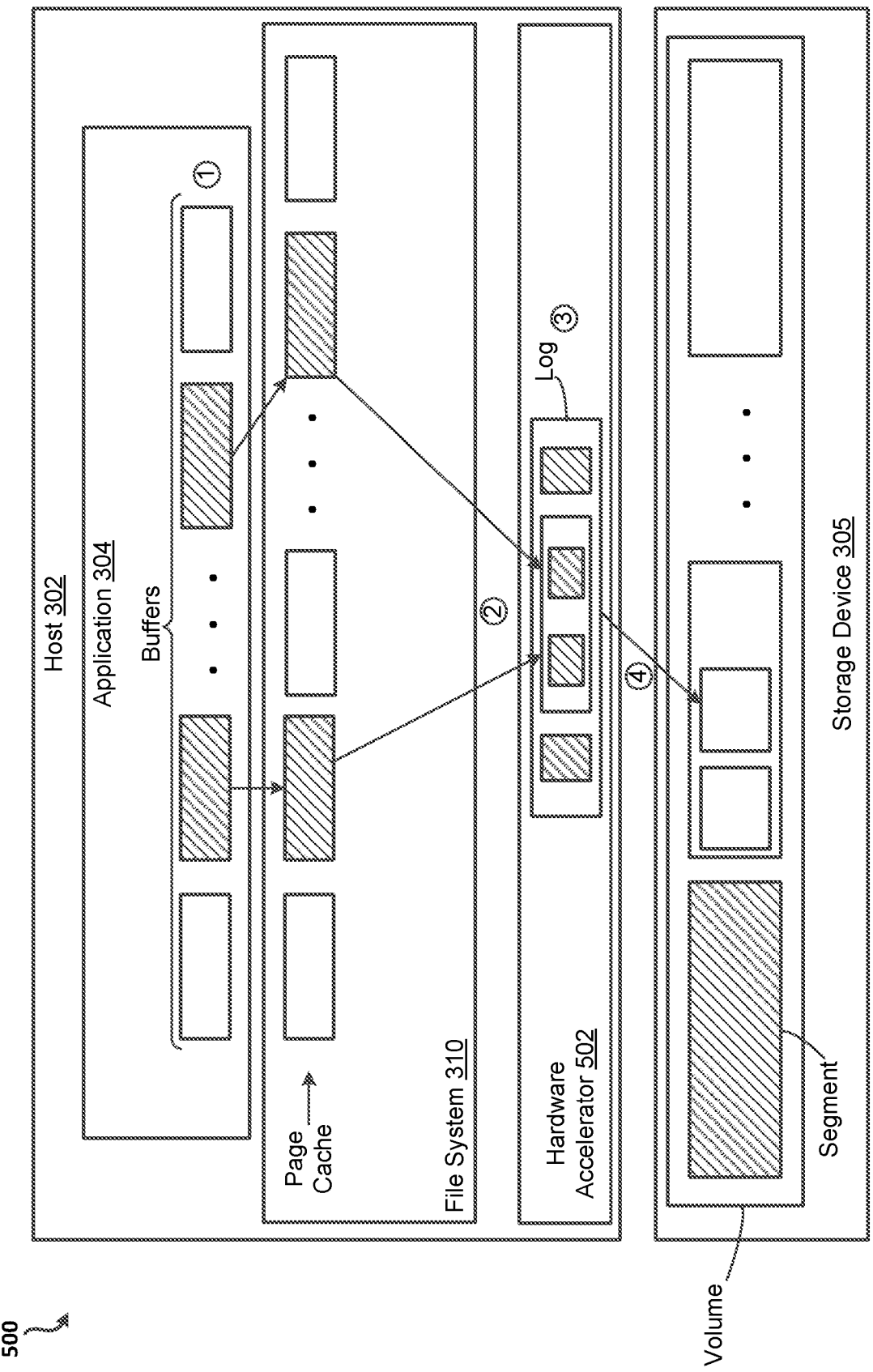
FIG. 5 shows an example system for improving file system operations using hardware accelerator on a write path in accordance with the present disclosure.

As described above, hardware accelerator may be used to enhance the performance of file system operations on the write path. FIG. 5 shows an example system 500 for improving file system operations using hardware accelerator in a write path. The application 304 may allocate buffer and generate data (e.g., text input by users or photos created by users) in the buffer. If data were already stored into a file, then the file may need to be read into the application's buffer before any modifications can be made to the file. The application 304 may read or pre-fetch file content into one or more internal buffer(s) associated with the application 304. At numeral 1, the application 304 may generate new data in the internal buffer(s). The application 304 may also update/modify content in the internal buffer(s). The internal buffer(s) may comprise one or more dirty buffers that need to be stored or flushed into the storage device 305.

The file system 310 may comprise a page cache. The page cache may store up-to-date memory pages (containing the same data as the storage device has) and dirty memory pages (containing new data that have not been synchronized with the storage device) with file content. At numeral 2, the file system 310 may copy the dirty memory pages into a memory area associated with a hardware accelerator 502. The file system 310 may copy the dirty memory pages into a memory area associated with a hardware accelerator 502 during write_page( ) calls. Then, the file system 310 may initiate the log preparation operations using the hardware accelerator 502. The file system 310 may initiate the log preparation operations using logic associated with the hardware accelerator 502. At numeral 3, a log may be prepared by the hardware accelerator 502 based on performing the log preparation operations. The log may be prepared by the hardware accelerator 502 before issuing a write I/O request, thereby creating a smaller payload of the write I/O request and decrease throughput of the write I/O request. The hardware accelerator 502 may be configured to execute the compute-intensive parts of the log preparation operations, such as the compression, delta encoding, and/or the compaction, without using CPU resources of the host 302.

At numeral 4, the prepared log may be sent (e.g., flushed) to the storage device 305 for persistent storage. Sending the log to the storage device 305 for storage may comprise making the log persistent. The prepared log may be sent to the storage device 305 in the form of one or more write I/O requests. The prepared log may be sent to the storage device 305 from the hardware accelerator 502. In examples, the file system may request log preparation by the hardware accelerator, and the file system may then send I/O request(s) with the prepared log(s) to the storage device 305. Alternatively, the hardware accelerator may directly send I/O request(s) with the prepared log(s) onto the storage device side without involving the file system.

Offloading the log preparation to hardware accelerator(s), e.g., the hardware accelerator 502, may significantly increase the performance of file system operations, as it prevents the file system 310 from having to spend resources on the log preparation operations. To initiate the log preparation operations, the file system 310 may only need to submit a request to a queue of the hardware accelerator 502. In embodiments, the queue may not be enough to handle all requests from the file system. The file system may check the congestion state of the hardware accelerator's queue. If the hardware accelerator has too many requests in the queue, then the file system may prepare the log without using the hardware accelerator. The hardware accelerator(s) may be configured to process multiple requests for log creation and/or preparation in parallel.

Figure 6:
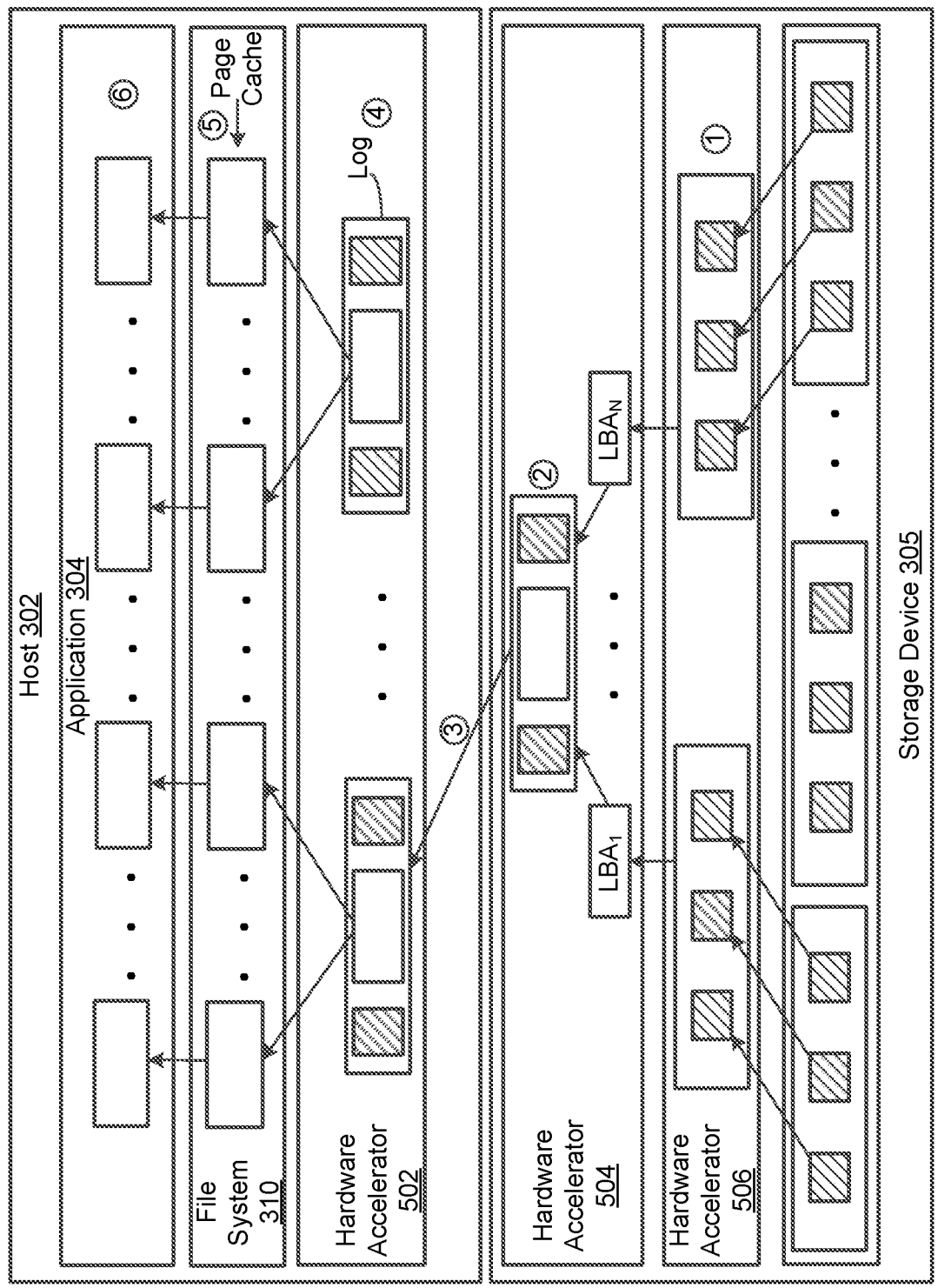
FIG. 6 shows an example system for hardware for improving file system operations using hardware accelerator on a read path in accordance with the present disclosure.

As described above, hardware accelerator(s) may also be used to enhance the performance of file system operations on the read path. FIG. 6 shows an example system 600 for improving file system operations using hardware accelerator on a read path. A persistent memory in the storage device 305 may be configured to persistently store user data and file system metadata. User data and file system metadata may be store in the form of logs. Each log may start from a header. The header may describe the structure of the data payload. It may need to read a whole log (or a portion of the log) to extract some logical blocks. In the case of delta-encoded data, the content of a logical block may be distributed amongst multiple logs. Thus, it may need to pre-fetch or read the content of multiple logs. The multiple logs may represent more than 4K.

Offloading operations to hardware accelerator(s) may significantly enhance performance of file system operations on a read path. At numeral 1, the storage device 305 may read log(s) from the persistent memory, parse the log(s) and execute delta-decoding of data internally using a hardware accelerator, e.g., a first hardware accelerator 506. By offloading the reading, parsing and delta-decoding operations in a hardware accelerator of the storage device, the storage device 305 may not need to copy initial log(s) from the host side and the CPU and/or DRAM resources on the host side may not be consumed.

In examples, if the log is stored in a physical sector only, the extracted content from the physical sector will be sent to the host side with no need of creating a new log. A physical sector may be 4 KB, for example. In embodiments, even if the initial log is spread among multiple physical sectors, the extracted content may be small (e.g., represented by a 4K piece of data or several 4 KB pieces of data). If the extracted content is small, a new log does not need to be created. In other examples, if the requested/extracted content is of significant size (e.g., 128 KB), then the storage device may create a new log to compact the extracted content. For example, extracted content with a size of 128 KB may be compacted into a smaller log (e.g., 16 KB) using compression and/or compaction.

At numeral 2, The storage device 305 may use a second hardware accelerator 504 to create a new log by combining several LBAs (e.g., extracted content from multiple logs or multiple physical sectors). Combining the several LBAs may comprise compressing and/or compacting the extracted content of multiple physical sectors into a new log. Compressing and/or compacting the extracted content of multiple physical sectors into a new log may decrease the amount of data in one operation and improve the overall throughput between the host 302 and the storage device 305.

The newly created log may be sent to the host side. At numeral 3, a new log may be placed into a memory area associated with a third hardware accelerator 502. The host 302 may parse and extract data from the new log using the third hardware accelerator 502. At numeral 4, the host 302 may use the third hardware accelerator 502 to parse and decompress the new log. The log may be parsed and decompressed to extract the requested data. The throughput of read I/O request(s) may be improved. At numeral 5, the file system 310 may prepare a page cache. To prepare the page cache, the file system 310 may place the retrieved data into a page cache that can be accessed by the application 304. A user-space application may not be able to directly access the page cache in kernel-space. The page cache content may need to be copied into the application's buffer(s). At numeral 6, the application 304 may read the internal buffer(s).

Offloading log-related operations in hardware accelerators may significantly improve the performance of file system operations. Smaller payloads may be prepared without using a hardware accelerator. The file system logic may prepare smaller payloads using CPU resources. However, hardware accelerator(s) may be able to prepare smaller payloads faster and without using CPU resources. Smaller payloads of write I/O requests may be created by preparing logs by hardware accelerator(s) before issuing the write I/O requests. The payloads of read I/O requests may also be decreased by using hardware accelerator(s) on the storage device side to prepare log(s). The throughput of one I/O request may be decreased by making the one I/O request smaller. Since more I/O requests may be sent per time unit (e.g., one second) for smaller I/O requests, the overall throughput may be increased. Offloading operations to hardware accelerator(s) may also accelerate log preparation, log parsing, decompression, and/or delta-decoding operations. Further, different logs may be processed in a massively parallel manner, e.g., for read operations.

Figure 7:
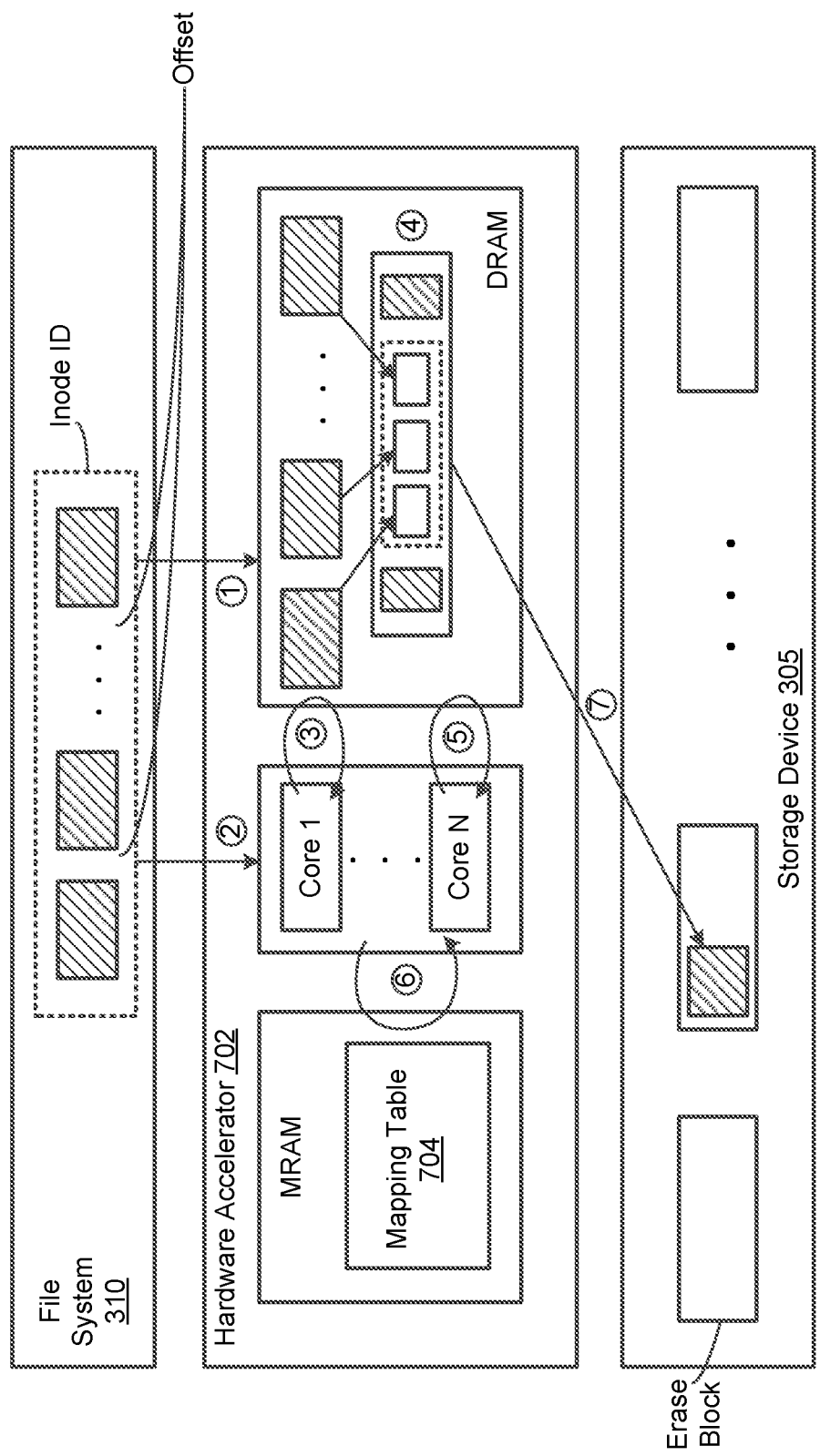
FIG. 7 shows an example system for log preparation in accordance with the present disclosure.

As described above, the performance of file system operations may be enhanced by offloading log preparation to the hardware accelerator. FIG. 7 shows an example system 700 for hardware-based log preparation. At numeral 1, the file system 310 may copy dirty memory pages into a special DRAM area. The special DRAM area may be dedicated to a hardware accelerator 702. At numeral 2, the file system 310 may submit a request for log preparation to the hardware accelerator 702. The request may identify an index node (inode) ID, a data offset in file, and a page count associated with the dirty memory pages.

The file system and/or the hardware accelerator may distribute memory pages amongst the core(s) of the hardware accelerator for processing. To distribute the memory pages amongst the core(s), the file system and/or the hardware accelerator may identify the location of every set of memory pages in the special DRAM area. The core(s) may process requests for different erase blocks in a parallel manner. At numeral 3, preparation of the log(s) may be initiated by compressing or applying delta-encoding logic to the memory pages by multiple cores of the hardware accelerator 702. At numeral 4, all compressed memory pages may be placed and compacted into the payload area of a log. At numeral 5, the core(s) of the hardware accelerator 702 may prepare a header and a footer associated with the log.

An erase block and offset in the erase block may be defined. The erase block and offset in the erase block may be defined for storing the log in the storage device 305 after the log is prepared by the hardware accelerator. The erase block allocation(s) may be managed by file system 310 or by the hardware accelerator 702 itself. The hardware accelerator 702 may comprise a mapping table 704. At numeral 6, an association of {inode ID, offset in file, number of logical blocks} with {erase block ID, offset into erase block, length of the log in physical sectors} may be stored in the mapping table. The mapping table 704 may be used to identify the location of log(s) that store the content of a particular file. In examples, the mapping table may be stored in the MRAM. In other examples, MRAM may not be enough to store the whole mapping table, and the mapping table may be stored in persistent media (e.g., NAND flash). Regardless, the file system does not need to store or manage such metadata. The storage device may be completely responsible for managing the mapping table. At numeral 7, the prepared log may be flushed into the storage device 305. The prepared log may be flushed into the storage device 305 by the hardware accelerator 702. The hardware accelerator may need to notify the file system that the flush operation has been finished or the file system may need to manage execution of the flush operation by the hardware accelerator. Otherwise, the file system may try to read data that has not yet reached the persistent media if the file system is not aware whether the flushing operation has been finished. Alternatively, the file system may execute the flush operation of the prepared log.

Offloading the log(s) preparation to the hardware accelerator may significantly improve performance of file system operations. A file system (e.g., the file system 310) may simply copy dirty pages into a memory associated with the hardware accelerator (e.g., the hardware accelerator 702). All flushing logic may be executed by the hardware accelerator 702 without any file system activity and without spending any resources of the host 302. This approach may significantly improve the performance of file system operations and facilitate massively parallel file system operations The throughput of one I/O request may be decreased by making the one I/O request smaller. Since more I/O requests may be sent per time unit (e.g., one second) for smaller I/O requests, the overall throughput may be increased.

Figure 8:
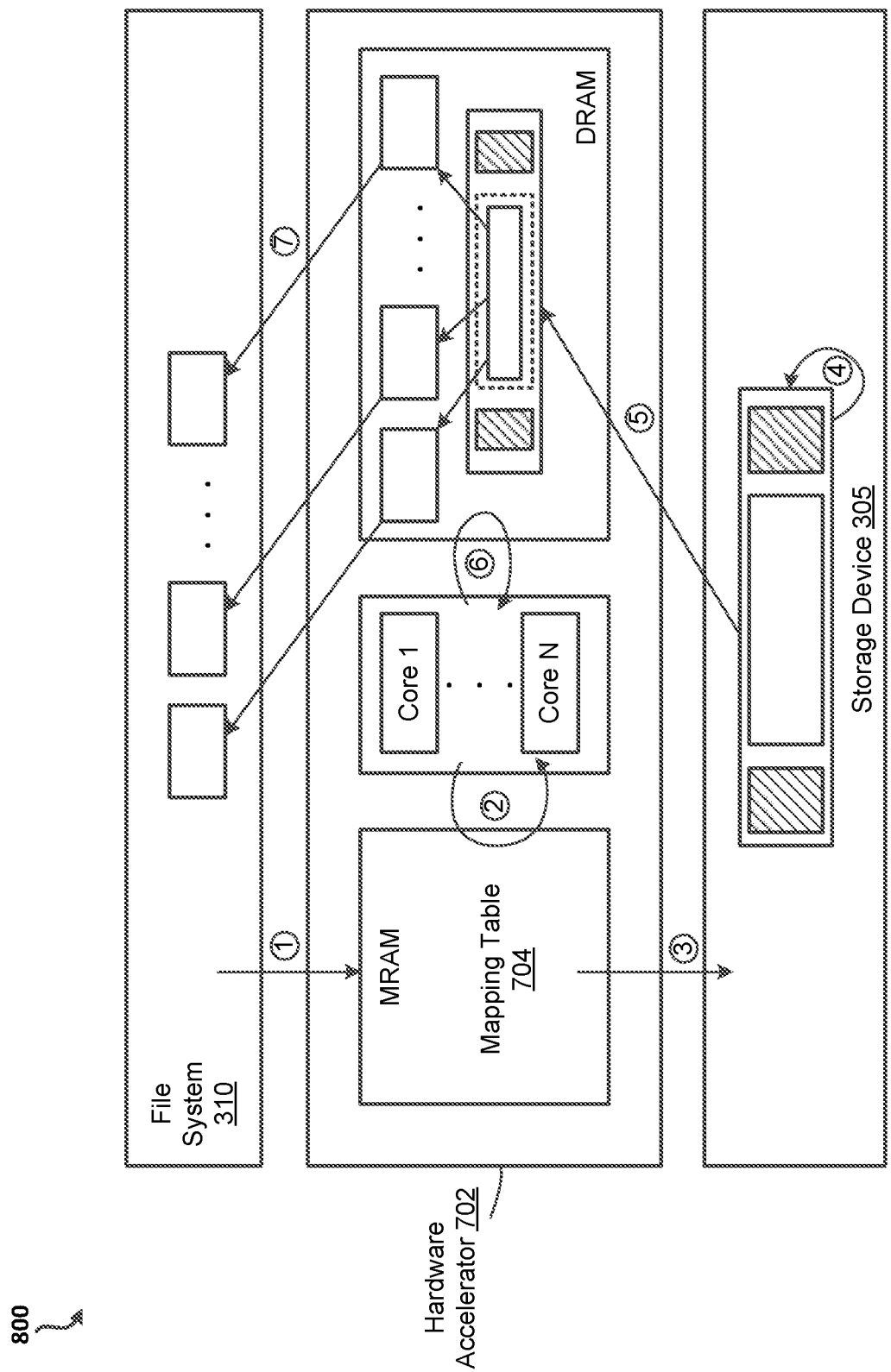
FIG. 8 shows an example system for log parsing in accordance with the present disclosure.

As described above, the performance of file system operations may be enhanced by offloading log parsing to a hardware accelerator. FIG. 8 shows an example system 800 for hardware-based log parsing. At numeral 1, the file system 310 may submit a request for log parsing to the hardware accelerator 702. The request may identify an index node (inode) ID, a data offset in file, and a length of the data that needs to be read. At numeral 2, the hardware accelerator 702 may convert the {inode ID, offset in file, length} into a sequence of {erase block ID, offset, length} descriptors associated with logs that need to be processed. The hardware accelerator 702 may convert the {inode ID, offset in file, length} into the sequence of {erase block ID, offset, length} descriptors based on the mapping table 704. In embodiments, if the mapping table is big, then the hardware accelerator may pre-fetch metadata from NAND flash into MRAM memory. At numeral 3, the hardware accelerator 702 may request a read or preparation of the log(s). For write operations, as discussed with regard to FIG. 7, MRAM may be a temporary buffer on the hardware accelerator side for write operations to store an association between {inode ID, etc} and {erase block number, etc}. However, this metadata may need to be stored into the storage device for read operations. For read operations, the main instance of the mapping table may be stored on the storage device side. Even if the whole mapping table can be kept in MRAM on the hardware accelerator side, the metadata may still need to be stored in the storage device. Otherwise, another hardware accelerator may be unable to extract data. Thus, the storage device needs to use the mapping table to read/parse a log without involving the hardware accelerator on the host side.

At numeral 4, the storage device 305 may delta-decode and prepare the log(s). For a read operation, the hardware accelerator may parse the log and execute delta-decoding. Then the data may be delivered into the memory pages of the page cache. At numeral 5, the hardware accelerator 702 may read the prepared log(s). The hardware accelerator 702 may reads the log(s) from the storage device 305 and may execute log parsing and delta-decoding. For example, the hardware accelerator 702 may copy the log's content into the DRAM of the hardware accelerator 702. At numeral 6, the hardware accelerator 702 may parse the header of the log. The hardware accelerator 702 may retrieve metadata that can be used to retrieve the requested logical block content. At numeral 6, the hardware accelerator 702 may also execute decompression and/or delta-decoding of the log's payload. Finally, at numeral 7, the memory pages may be read into the page caches of the file system 310. The page caches of the file system 310 may receive the requested data. The hardware accelerator 702 may place the prepared content into the page cache or the file system may copy memory pages from the hardware accelerator memory into the page cache.

In embodiments, the read process may be split into several steps. First the log(s) may be read from persistent memory on the storage device side. The log(s) may then be parsed by a hardware accelerator on the storage device side. Delta-decoding may be executed by the hardware accelerator on the storage device side. If requested data are stored in several physical sectors, data extracted from the several physical sectors may be combined into one log using compression. The new log may be sent to the host side. The new log may be parsed and the log content may be decompressed by a hardware accelerator on the host side. The requested data may be delivered into file system's page cache(s).

In this manner, hardware accelerator(s) may significantly improve the performance of file system operations. Log based exchange between the host and storage device may increase overall throughput and improve the performance of data exchange between the host and the storage device. Hardware accelerator(s) may facilitate the execution of data operations with different erase blocks or zones in a massively parallel manner. Further, the techniques described in the present disclosure enable a file system to delegate compute-intensive operations, such as compression and/or delta-encoding, to the hardware accelerator(s) in order to simplify the file system logic, improve performance of file system operations, and facilitate parallelism of file system operations on the hardware level.

Figure 9:
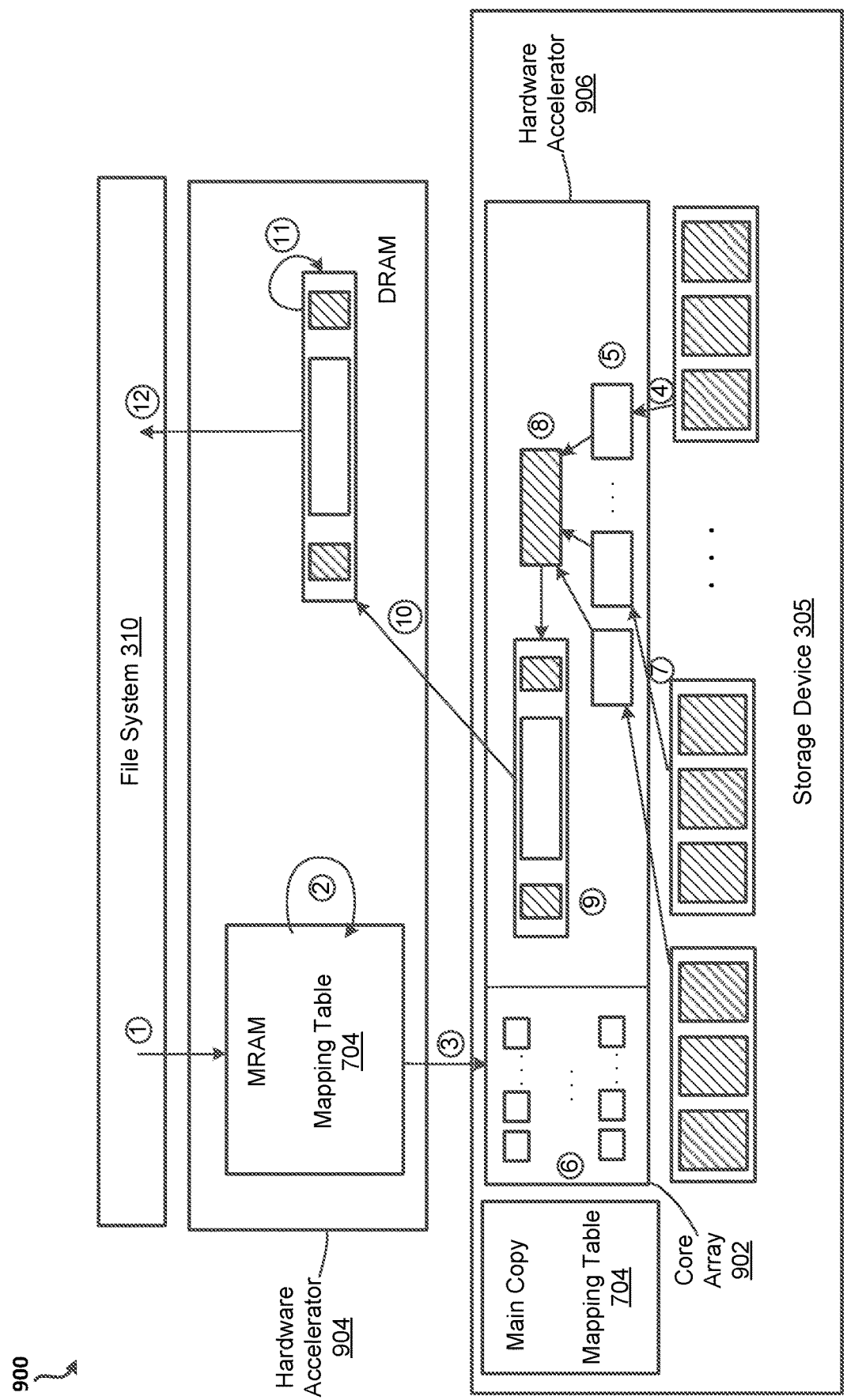
FIG. 9 shows an example system for improving file system operations using hardware accelerator on a read path in accordance with the present disclosure.

In embodiments, offloading data decoding to the storage device may significantly improve performance of file system operations. FIG. 9 shows an example system 900 for data decoding acceleration by a storage device. At numeral 1, the file system 310 may identify, for each submitted request, an inode ID, a data offset in file, and a page count. At numeral 2, the hardware accelerator 904 may convert the {inode ID, offset in file, length} into a sequence of {erase block ID, offset, length} descriptors associated with logs that need to be processed. The hardware accelerator 904 may convert the {inode ID, offset in file, length} into the sequence of {erase block ID, offset, length} descriptors based on the mapping table 704. Alternatively, the {inode ID, offset in file, length} may be delivered to the storage device 305. The storage device 305 may convert the {inode ID, offset in file, length} into the sequence of {erase block ID, offset, length} descriptors based on a main copy of the mapping table 704 stored in the storage device 305. At numeral 3, the hardware accelerator 904 may request a read of the log(s) from the storage device 305. As described above and as shown in FIG. 9, for read operations, the main instance of the mapping table 704 may be stored on the storage device 305 side. Even if a whole mapping table can be kept in MRAM on the hardware accelerator side, the metadata may still need to be stored in the storage device 305. Otherwise, another hardware accelerator may be unable to extract data. Thus, the storage device 305 needs to use the mapping table 704 to read/parse a log without involving the hardware accelerator 904 on the host side.

At numeral 4, the storage device 305 may read or access log(s) in persistent memory. For example, the log's content may be copied from persistent memory into a DRAM of the hardware accelerator 906. At numeral 5, the hardware accelerator 906 on the storage device side may parse the log. The hardware accelerator 906 may retrieve metadata that can be used to retrieve the requested logical block content. At numeral 6, the hardware accelerator 906 may detect the location of deltas of the requested logical block(s). At numeral 7, the hardware accelerator 906 may read the logs with the deltas. The hardware accelerator 906 may parse the logs. At numeral 8, delta-decoding may be executed by the hardware accelerator 906. At numeral 9, the hardware accelerator 906 may prepare a log based on the delta-decoded data. The hardware accelerator 906 may prepare a temporary log if a size of delta-decoded data is large. For example, if the size of the data is greater than a predetermined threshold, a new temporary log may be created/prepared. If the size of delta-decoded data is not significant, a temporary log may not be prepared.

In embodiments, the content extracted from several physical sectors may be combined into one log using compression. At numeral 10, the prepared log may be sent to the host side. The prepared log may be sent to the hardware accelerator 904 on the host side. At numeral 11, the hardware accelerator 904 may parse the log. The log content may be decompressed by the hardware accelerator 904. At numeral 12, the memory pages may be read into the page caches of the file system 310. For example, the page caches of the file system 310 may receive the requested data.

Figure 10:
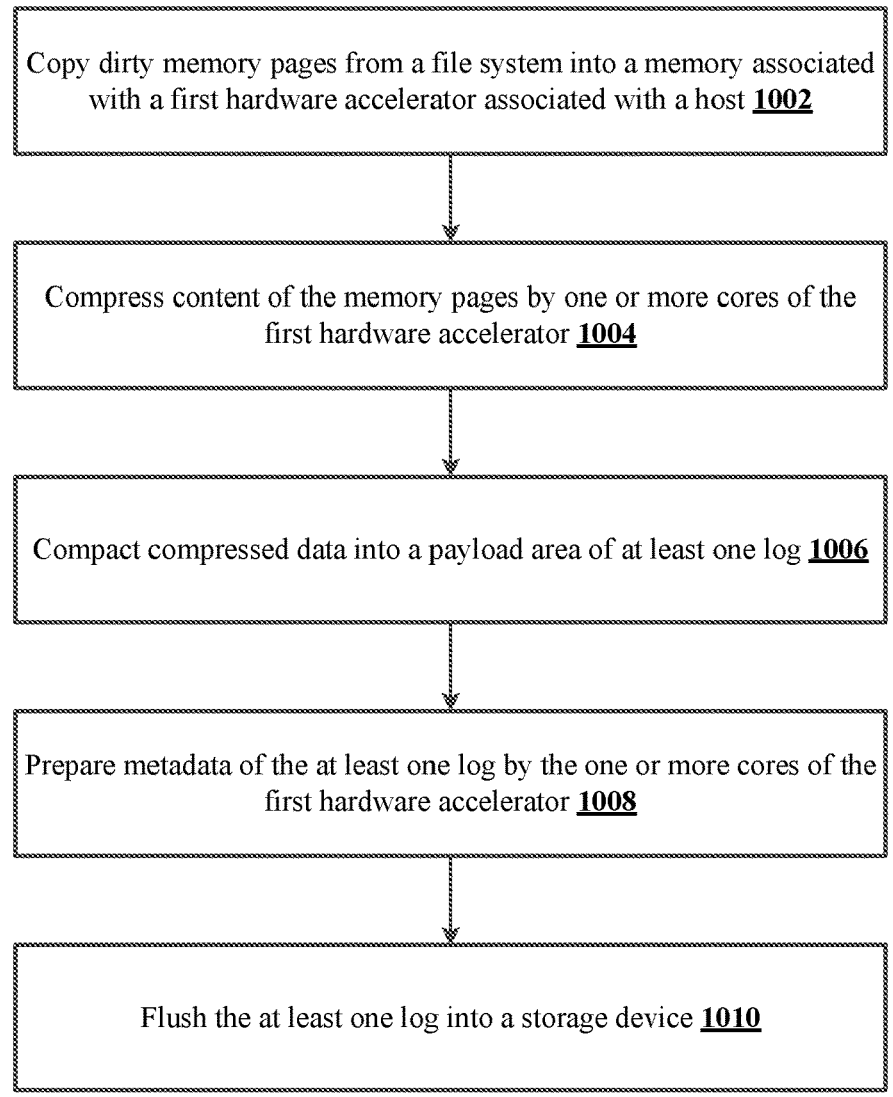
FIG. 10 shows an example process for improving performance of file system operations in accordance with the present disclosure.

FIG. 10 illustrates an example process 1000. The process 1000 may be performed for improving performance of file system operations. For example, the process 1100 may be performed by the system 700 depicted in FIG. 7. Although depicted as a sequence of operations in FIG. 10, those of ordinary skill in the art will appreciate that various embodiments may add, remove, reorder, or modify the depicted operations.

At 1002, dirty memory pages may be copied. The dirty memory pages may be copied by a file system (e.g., the file system 310) from a page cache. The dirty memory pages may be copied into a memory associated with a first hardware accelerator (e.g., the hardware accelerator 702). The first hardware accelerator may be associated with a host. The dirty memory pages may be copied into a special DRAM area dedicated to the first hardware accelerator. The file system may submit a request for preparing log(s) to the hardware accelerator. The request may identify an inode ID, a data offset in file, and a page count associated with the dirty memory pages.

After the file system has identified the inode ID, the data offset in file, and the page count, the file system may initiate preparation of log(s). Preparation of the log(s) may be initiated by compressing all submitted memory pages. At 1004, the memory pages may be compressed. The memory pages may be compressed by one or more cores of the first hardware accelerator. All compressed memory pages may be placed and compacted into payload area(s) of the log(s). At 1006, the compressed data may be compacted. The compressed data may be compacted into a payload area of at least one log.

At 1008, metadata of the at least one log may be prepared. The metadata may be prepared by the one or more cores of the first hardware accelerator. For example, the core(s) of the first hardware accelerator may prepare a header and a footer associated with the log. At 1010, the at least one log may be flushed into a storage device. The prepared log may be flushed into the storage device from the first hardware accelerator.

Figure 11:
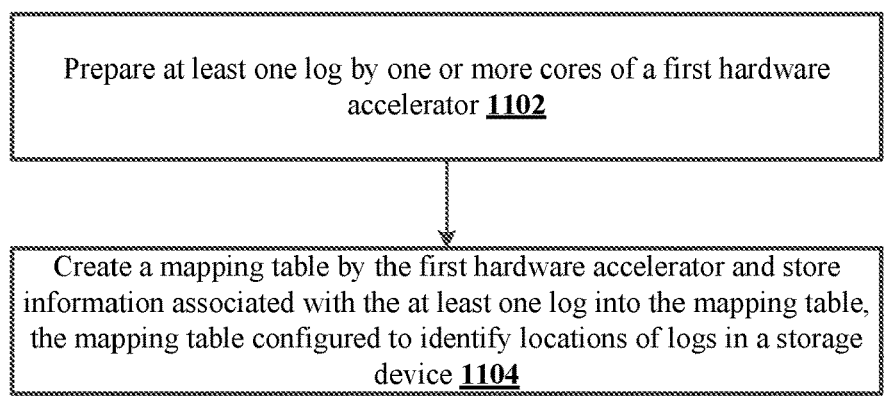
FIG. 11 shows an example process for improving performance of file system operations in accordance with the present disclosure.

FIG. 11 illustrates an example process 1100. The process 1100 may be performed for improving performance of file system operations. For example, the process 1100 may be performed by the system 700 depicted in FIG. 7. Although depicted as a sequence of operations in FIG. 11, those of ordinary skill in the art will appreciate that various embodiments may add, remove, reorder, or modify the depicted operations.

A file system may initiate preparation of the log(s). At 1102, at least one log may be prepared. The at least one log may be prepared by one or more cores of a first hardware accelerator (the hardware accelerator 702). Preparation of the log(s) may comprise compressing and/or delta-encoding all submitted memory pages. The memory pages may be compressed. The memory pages may be compressed by one or more cores of the first hardware accelerator. All compressed memory pages may be placed and compacted into the log's payload area. The compressed data may be compacted. The compressed data may be compacted into a payload area of at least one log. Metadata of the at least one log may be prepared. The metadata may be prepared by the one or more cores of the first hardware accelerator.

At 1104, a mapping table may be created. The mapping table (e.g., the mapping table 704) may be created by the first hardware accelerator (e.g., the hardware accelerator 702). The mapping table may be created one time. The mapping table does not need to be created for every request. Information associated with the at least one log may be stored into the mapping table. The mapping table may be configured to identify locations of logs in a storage device (e.g., the storage device 305). For example, the mapping table may be used to identify the location of log(s) that store the content of a particular file in the storage device. The mapping table may store an association of {inode ID, offset in file, number of logical blocks} with {erase block ID, offset into erase block, length of the log in physical sectors} descriptors about logs. The prepared logs may be flushed into the storage device. The prepared log may be flushed into the storage device by the first hardware accelerator.

Figure 12:
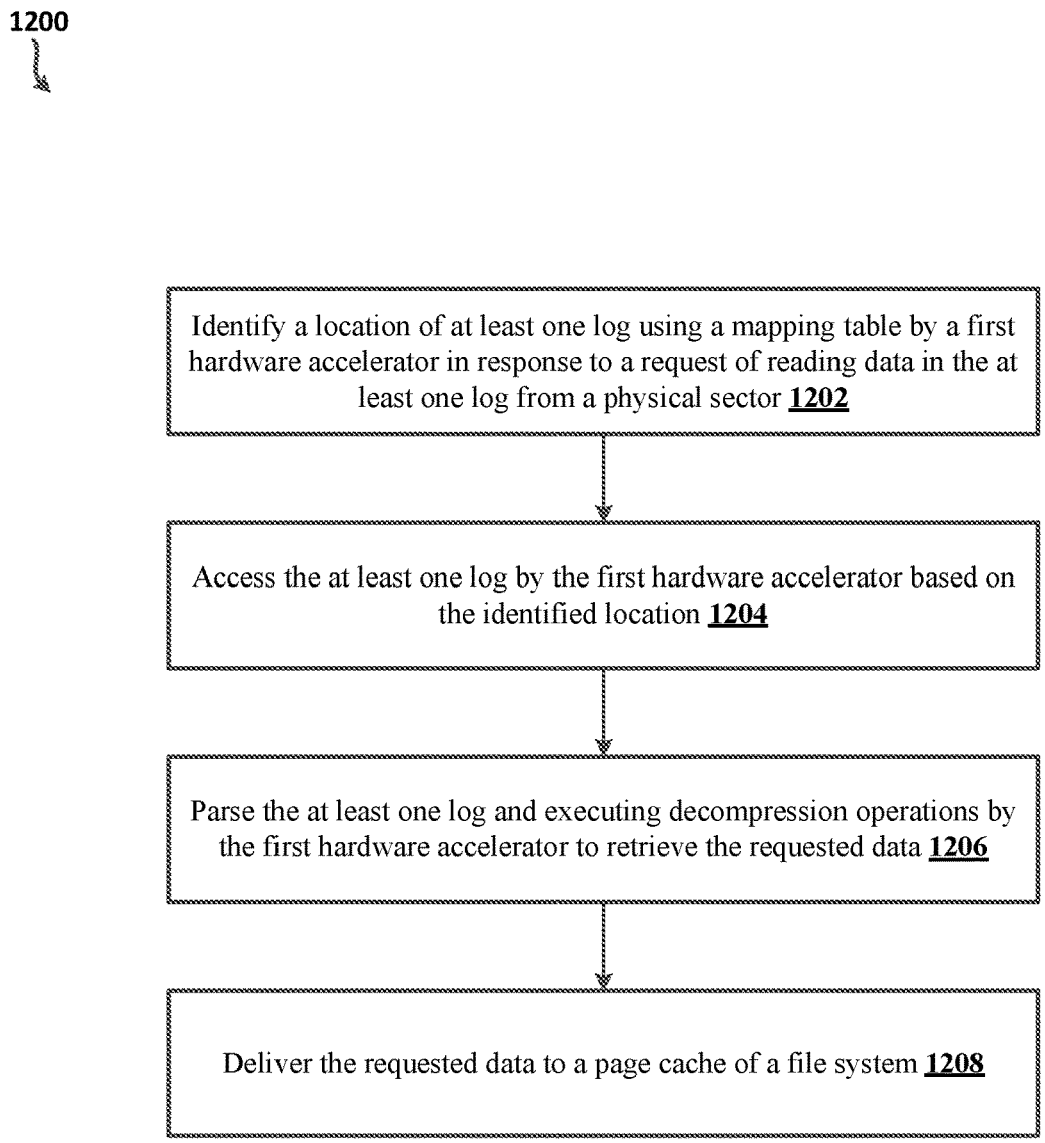
FIG. 12 shows an example process for improving performance of file system operations in accordance with the present disclosure.

FIG. 12 illustrates an example process 1200. The process 1200 may be performed for improving performance of file system operations. For example, the process 1200 may be performed by the system 800 depicted in FIG. 8. Although depicted as a sequence of operations in FIG. 12, those of ordinary skill in the art will appreciate that various embodiments may add, remove, reorder, or modify the depicted operations.

At 1202, a location of at least one log may be identified. The location of the at least one log may be identified using a mapping table (e.g., the mapping table 704). The mapping table may be created one time. The mapping table does not need to be created for every request. The location of the at least one log may be identified by a first hardware accelerator (e.g., the hardware accelerator 702) in response to a request of reading data in the at least one log from at least one physical sector. The request may identify some piece of data by {inode ID, offset, number of memory pages} or by logical block ID(s). This identification information may be converted into log ID(s) using the mapping table. The mapping table may indicate how to identify erase block(s), and metadata of the erase black(s) may indicate how to find the log(s). A log may be bigger than one physical sector. While a log may be stored only in one physical sector, many logs may contain multiple physical sectors. The mapping table may store information associated with the at least one log. The mapping table may be configured to identify locations of logs in a storage device (e.g., the storage device 305). For example, the mapping table may be used to identify the location of log(s) that store the content of a particular file. The mapping table may store an association of {inode ID, offset in file, number of logical blocks} with {erase block ID, offset into erase block, length of the log in physical sectors} descriptors about logs. As described above, such detailed information could be huge in size. The mapping table may associate inode IDs with erase block IDs. Logs in erase blocks can keep the metadata that provides the way to find the locations of particular data. The MRAM may store the mapping table with a small size or a small portion of the mapping table.

At 1204, the at least one log may be accessed by the first hardware accelerator. The at least one log may be accessed based on the identified location. At 1206, the at least one log may be parsed. Decompression and/or delta-decoding operations may be executed by the first hardware accelerator to retrieve the requested data. The file system (e.g., the file system 310) may prepare a page cache. To prepare the page cache, the file system may place the retrieved data into a page cache that can be accessed by the application. At 1208, the requested data may be delivered to a page cache of a file system. The application may access the requested data.

Figure 13:
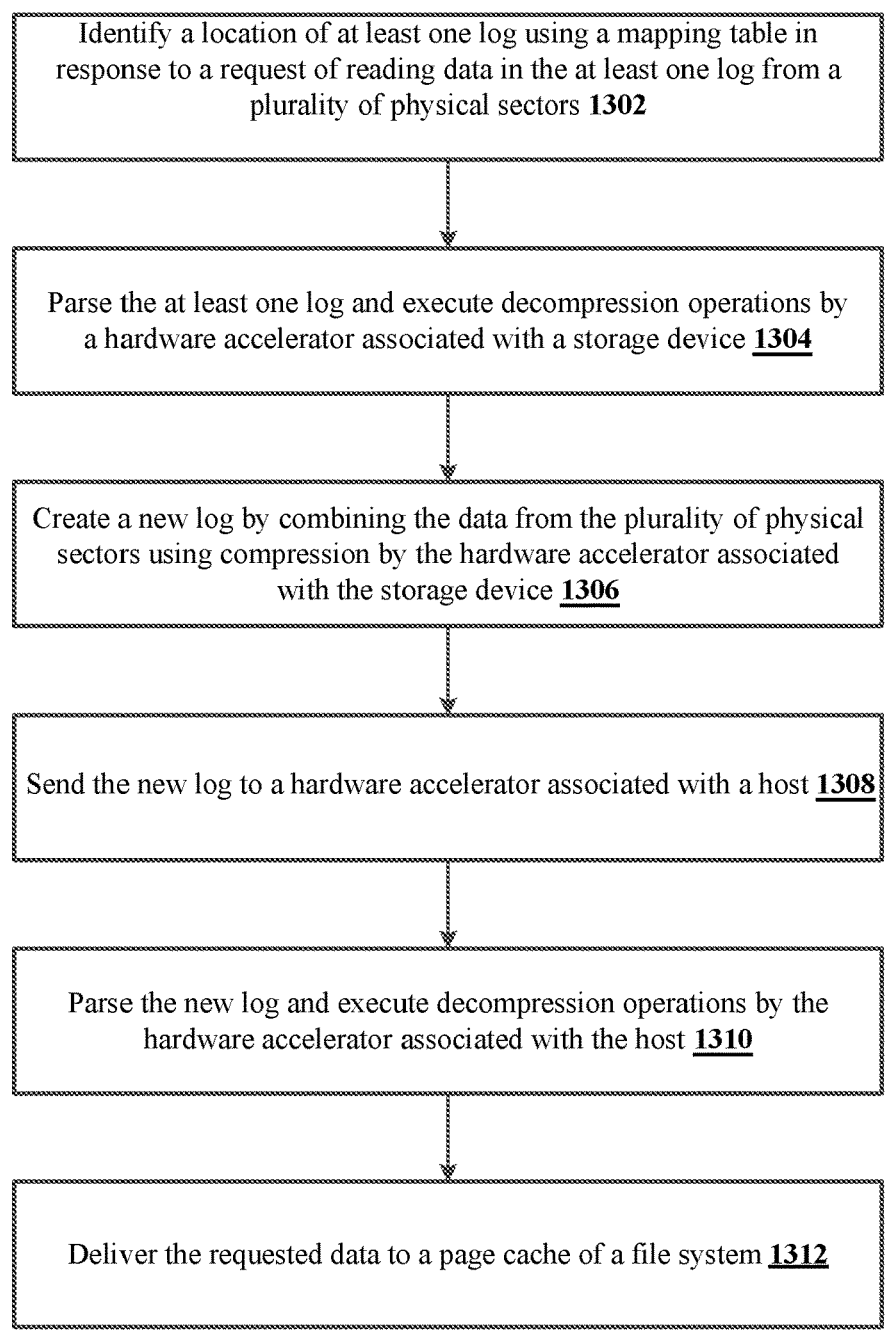
FIG. 13 shows an example process for improving performance of file system operations in accordance with the present disclosure.

FIG. 13 illustrates an example process 1300. The process 1300 may be performed for improving performance of file system operations. For example, the process 1300 may be performed by the system 900 depicted in FIG. 9. Although depicted as a sequence of operations in FIG. 13, those of ordinary skill in the art will appreciate that various embodiments may add, remove, reorder, or modify the depicted operations.

At 1302, a location of at least one log may be identified. The location of the at least one log may be identified using a mapping table (e.g., the mapping table 704). The mapping table may be located on the storage device side. In embodiments, the mapping table may have an architecture that distributes the knowledge between the host and the storage device. Thus, both the host and the storage device may use the mapping table to identify location of log(s). The mapping table may indicate how to identify erase block(s), and metadata of the erase black(s) may indicate how to find the log(s). The location of the at least one log may be identified by a hardware accelerator associated with a storage device (e.g., the storage device 305). The location of the at least one log may be identified in response to a request of reading data in the at least one log from a plurality of physical sectors. The request may contain an identification of file's portion. The identification information in the request may be converted into location of log(s) using the mapping table. In one example, the storage device may identify the location of the at least one log. The mapping table may store information associated with the at least one log. The mapping table may be configured to identify locations of log(s) in a storage device. For example, the mapping table may be used to identify the location of log(s) that store the content of a particular file. The mapping table may store an association of {inode ID, offset in file, number of logical blocks} with {erase block ID, offset into erase block, length of the log in physical sectors} descriptors about logs stored in the storage device.

The storage device may use a second hardware accelerator to combine several requested LBAs. At 1304, the at least one log may be parsed. Decompression and/or delta-decoding operations may be executed by a hardware accelerator associated with the storage device. At 1306, a new log may be created. The new log may be created in response to determining that a size of data extracted from the plurality of physical sectors is greater than a predetermined threshold. The new log may be created by combining the data from the plurality of physical sectors using compression. The new log may be created by the second hardware accelerator associated with the storage device. Compressing and/or compacting the content of physical sectors into a log may decrease the payload of one request, thus increasing overall throughput by sending more requests per time unit. At 1308, the new log may be sent to a hardware accelerator on the host side. At 1310, the new log may be parsed by a hardware accelerator associated with a host. Decompression operations may be executed by the hardware accelerator associated with the host. The log may be parsed and decompressed to extract the requested data. The file system (e.g., the file system 310) may prepare page cache(s). To prepare the page cache(s), the file system may place the retrieved data into page cache(s) that can be accessed by the application. At 1312, the requested data may be delivered to the page cache(s) of the file system. The application may access the requested data.

Figure 14:
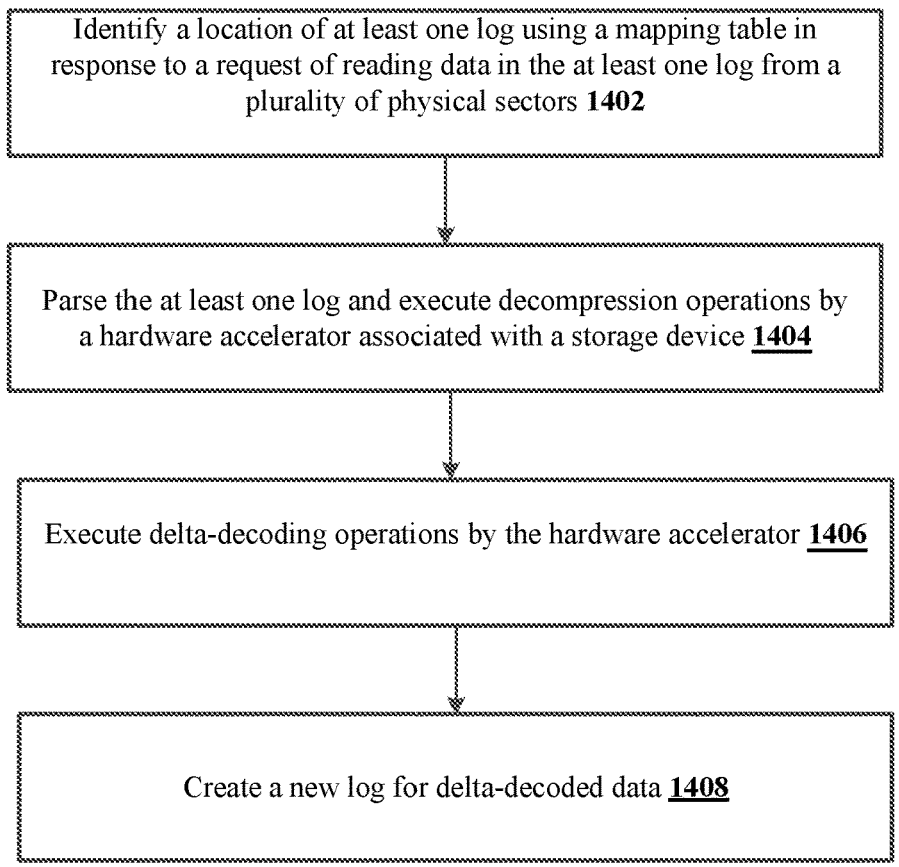
FIG. 14 shows an example process for improving performance of file system operations in accordance with the present disclosure.

FIG. 14 illustrates an example process 1400. The process 1400 may be performed for improving performance of file system operations. For example, the process 1400 may be performed by the system 900 depicted in FIG. 9. Although depicted as a sequence of operations in FIG. 14, those of ordinary skill in the art will appreciate that various embodiments may add, remove, reorder, or modify the depicted operations.

At 1402, a location of at least one log may be identified. The location of the at least one log may be identified using a mapping table (e.g., the mapping table 704). The location of the at least one log may be identified by a hardware accelerator associated with a storage device. The location of the at least one log may be identified in response to a request of reading data in the at least one log from a plurality of physical sectors. The mapping table may store information associated with the at least one log. The mapping table may be configured to identify locations of logs in a storage device (e.g., the storage device 305). For example, the mapping table may be used to identify the location of log(s) that store the content of a particular file. Alternatively, the mapping table may indicate how to identify erase block(s), and metadata of the erase black(s) may indicate how to find the log(s). The mapping table may store an association of {inode ID, offset in file, number of logical blocks} with {erase block ID, offset into erase block, length of the log in physical sectors} descriptors about logs stored in the storage device.

The storage device may use a second hardware accelerator to combine several requested LBAs. At 1404, the at least one log may be parsed. The at least one log may be parsed by the second hardware accelerator associated with the storage device. Decompression operations may be executed. The decompression operations may be executed by the second hardware accelerator associated with a storage device. At 1406, delta-decoding operations may be executed. The delta-decoding operations may be executed by the second hardware accelerator. At 1408, a new log may be created. The new log may be created for the delta-decoded data.

Figure 15:
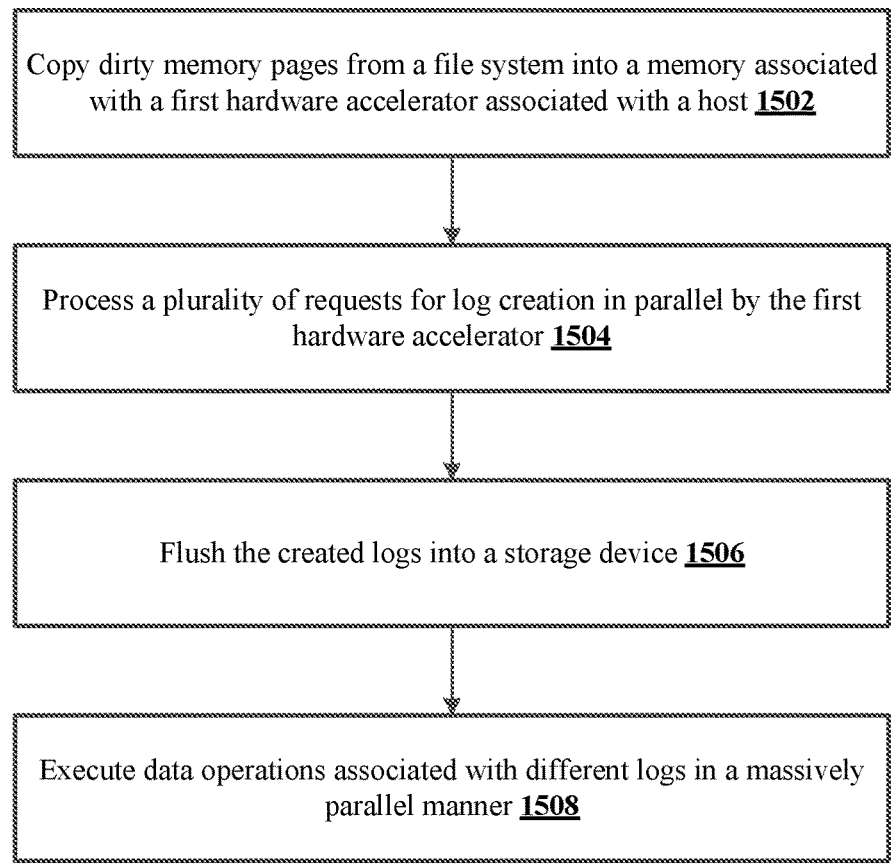
FIG. 15 shows an example process for improving performance of file system operations in accordance with the present disclosure.

FIG. 15 illustrates an example process 1500. The process 1500 may be performed for improving performance of file system operations. For example, the process 1500 may be performed by the system 500 or the system 700, depicted in FIGS. 5 and 7. Although depicted as a sequence of operations in FIG. 15, those of ordinary skill in the art will appreciate that various embodiments may add, remove, reorder, or modify the depicted operations.

At 1502, dirty memory pages may be copied. The dirty memory pages may be copied from a file system (e.g., the file system 310). The dirty memory pages may be copied into a memory of a first hardware accelerator (e.g., the hardware accelerator 502 or hardware accelerator 702). The first hardware accelerator may be associated with a host (e.g., the host 302). The dirty memory pages may be copied into a special DRAM area dedicated to the first hardware accelerator. Then, the file system may submit a request for preparing log(s) to the hardware accelerator. The request may identify an inode ID, a data offset in file, and a page count associated with the memory pages.

At 1504, a plurality of requests may be processed. The plurality of requests may comprise requests for log creation. The plurality of requests may be processed in parallel. The plurality of requests may be processed by the first hardware accelerator. Requests associated with different erase blocks may be processed independently from each other. At 1506, the created logs may be flushed into a storage device (e.g., the storage device 305). The created logs may be flushed into the storage device by the first hardware accelerator. At 1508, data operations may be executed. The data operations may be associated with different logs stored in the storage device. The data operations may be executed in a massively parallel manner. Massively parallel operations may be possible if the storage device is represented by multiple SSDs, for example. Additionally, or alternatively, it is also possible to write independently into different erase blocks. Parallel operations can be implemented on the basis of different erase blocks.

Figure 16:
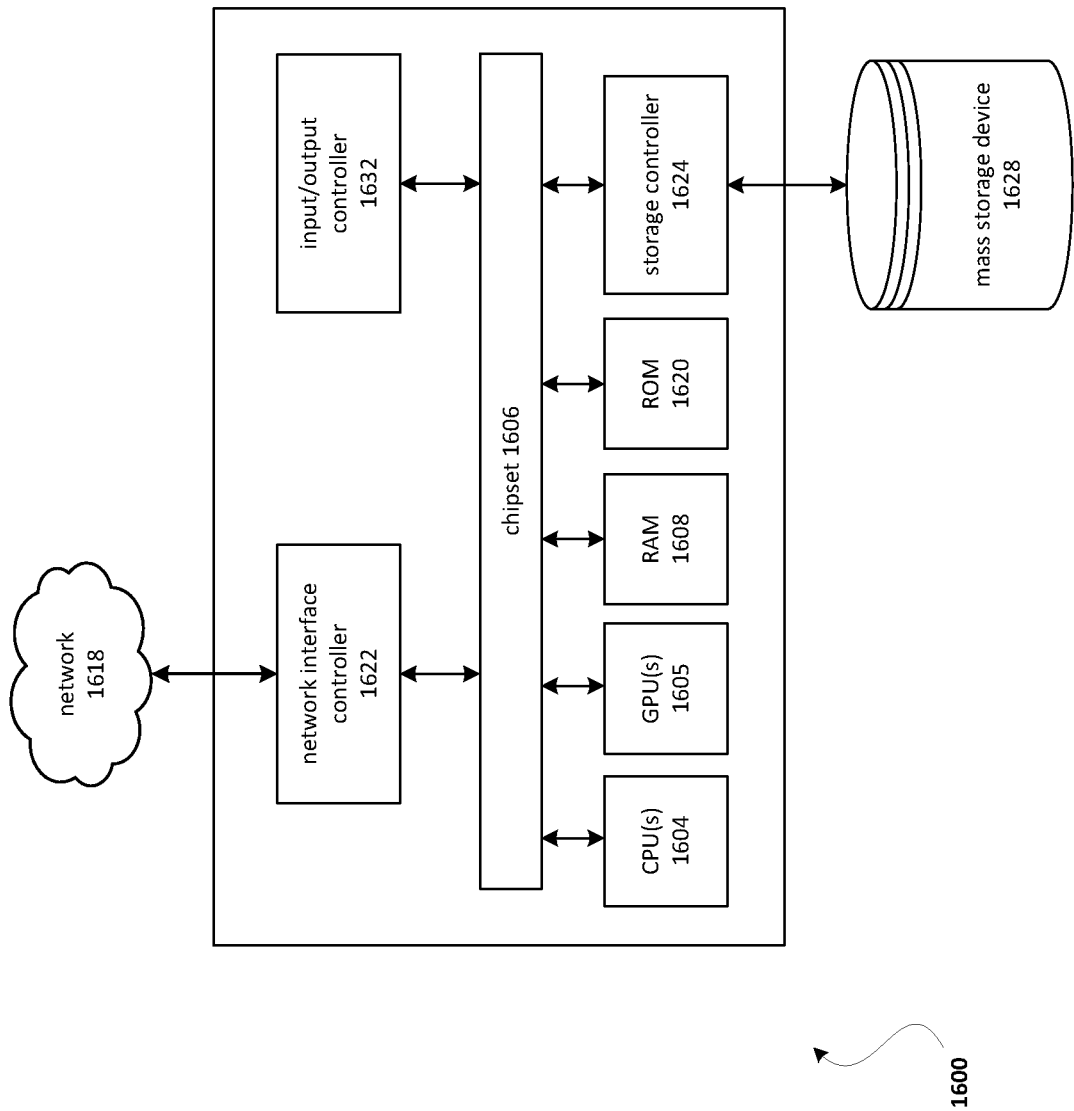
FIG. 16 shows an example computing device which may be used to perform any of the techniques disclosed herein.

FIG. 16 illustrates a computing device that may be used in various aspects, such as the host depicted in FIG. 1. The computer architecture shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1604 may be augmented with or replaced by other processing units, such as GPU(s) 1605. The GPU(s) 1605 may comprise processing units specialized for but not necessarily limited to highly parallel computations, such as graphics and other visualization-related processing.

A chipset 1606 may provide an interface between the CPU(s) 1604 and the remainder of the components and devices on the baseboard. The chipset 1606 may provide an interface to a random-access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN). The chipset 1606 may include functionality for providing network connectivity through a network interface controller (NIC) 1622, such as a gigabit Ethernet adapter. A NIC 1622 may be capable of connecting the computing device 1600 to other computing nodes over a network 1616. It should be appreciated that multiple NICs 1622 may be present in the computing device 1600, connecting the computing device to other types of networks and remote computer systems.

The computing device 1600 may be connected to a mass storage device 1628 that provides non-volatile storage for the computer. The mass storage device 1628 may store system programs, application programs, other program modules, and data, which have been described in greater detail herein. The mass storage device 1628 may be connected to the computing device 1600 through a storage controller 1624 connected to the chipset 1606. The mass storage device 1628 may consist of one or more physical storage units. The mass storage device 1628 may comprise a management component. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on the mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving performance of file system operations, comprising:
copying dirty memory pages from a file system into a memory associated with a first hardware accelerator associated with a host;
compressing content of the memory pages by one or more cores of the first hardware accelerator;
compacting compressed data into a payload area of at least one log;
preparing metadata of the at least one log by the one or more cores of the first hardware accelerator;
flushing the at least one log into a storage device;
wherein the method further comprises:

identifying a location of the at least one log using a mapping table by the first hardware accelerator in response to a request of reading data in the at least one log from at least one physical sector;

accessing the at least one log by the first hardware accelerator based on the identified location;

parsing the at least one log and executing decompression operations by the first hardware accelerator to retrieve the requested data; and delivering the requested data to a page cache of the file system.

2. The method of claim 1, further comprising:

creating a mapping table by the first hardware accelerator, the mapping table configured to identify locations of logs in the storage device.

3. The method of claim 1, further comprising:

identifying a location of the at least one log using a mapping table in response to a request of reading data in the at least one log from a plurality of physical sectors;

parsing the at least one log and executing decompression operations by a second hardware accelerator associated with the storage device;

in response to determining that a size of data extracted from the plurality of physical sectors is greater than a predetermined threshold, creating a new log by combining the data from the plurality of physical sectors using compression by the second hardware accelerator associated with the storage device; and sending the new log to the first hardware accelerator.

4. The method of claim 3, further comprising:

parsing the new log and executing decompression operations by the first hardware accelerator associated with the host; and delivering the requested data to a page cache of the file system.

5. The method of claim 3, wherein the creating a new log further comprises:

executing delta-decoding operations by the second hardware accelerator; and creating the new log for delta-decoded data.

6. The method of claim 1, wherein the at least one log further comprises a header depicting a structure of the payload area.

7. The method of claim 1, further comprising:

processing a plurality of requests for log creation in parallel by the first hardware accelerator.

8. The method of claim 1, further comprising:

executing data operations associated with different logs in a massively parallel manner.

9. A system, comprising:

at least one processor; and at least one memory comprising computer-readable instructions that upon execution by the at least one processor cause the computing device to perform operations comprising:

copying dirty memory pages from a file system into a memory associated with a first hardware accelerator associated with a host;

compressing content of the memory pages by one or more cores of the first hardware accelerator;

compacting compressed data into a payload area of at least one log;

preparing metadata of the at least one log by the one or more cores of the first hardware accelerator;

flushing the at least one log into a storage device;

wherein the operations further comprise:

identifying a location of the at least one log using a mapping table by the first hardware accelerator in response to a request of reading data in the at least one log from at least one physical sector;

accessing the at least one log by the first hardware accelerator based on the identified location;

parsing the at least one log and executing decompression operations by the first hardware accelerator to retrieve the requested data; and delivering the requested data to a page cache of the file system.

10. The system of claim 9, the operations further comprising:

creating a mapping table by the first hardware accelerator, the mapping table configured to identify locations of logs in the storage device.

11. The system of claim 9, the operations further comprising:

identifying a location of the at least one log using a mapping table in response to a request of reading data in the at least one log from a plurality of physical sectors;

parsing the at least one log and executing decompression operations by a second hardware accelerator associated with the storage device;

in response to determining that a size of data extracted from the plurality of physical sectors is greater than a predetermined threshold, creating a new log by combining the data from the plurality of physical sectors using compression by the second hardware accelerator associated with the storage device; and sending the new log to the first hardware accelerator.

12. The system of claim 11, the operations further comprising:

parsing the new log and executing decompression operations by the first hardware accelerator associated with the host; and delivering the requested data to a page cache of the file system.

13. The system of claim 11, wherein the creating a new log further comprises:

executing delta-decoding operations by the second hardware accelerator; and creating the new log for delta-decoded data.

14. A non-transitory computer-readable storage medium, storing computer-readable instructions that upon execution by a processor cause the processor to implement operations, the operations comprising:

copying dirty memory pages from a file system into a memory associated with a first hardware accelerator associated with a host;

compressing content of the memory pages by one or more cores of the first hardware accelerator;

compacting compressed data into a payload area of at least one log;

preparing metadata of the at least one log by the one or more cores of the first hardware accelerator;

flushing the at least one log into a storage device;

wherein the operations further comprise:

identifying a location of the at least one log using a mapping table by the first hardware accelerator in response to a request of reading data in the at least one log from at least one physical sector;

accessing the at least one log by the first hardware accelerator based on the identified location;

parsing the at least one log and executing decompression operations by the first hardware accelerator to retrieve the requested data; and delivering the requested data to a page cache of the file system.

15. The non-transitory computer-readable storage medium of claim 14, the operations further comprising:

creating a mapping table by the first hardware accelerator, the mapping table configured to identify locations of logs in the storage device.

16. The non-transitory computer-readable storage medium of claim 14, the operations further comprising:

identifying a location of the at least one log using a mapping table in response to a request of reading data in the at least one log from a plurality of physical sectors;

parsing the at least one log and executing decompression operations by a second hardware accelerator associated with the storage device;

in response to determining that a size of data extracted from the plurality of physical sectors is greater than a predetermined threshold, creating a new log by combining the data from the plurality of physical sectors using compression by the second hardware accelerator associated with the storage device; and sending the new log to the first hardware accelerator.

17. The non-transitory computer-readable storage medium of claim 16, the operations further comprising:

parsing the new log and executing decompression operations by the first hardware accelerator associated with the host; and delivering the requested data to a page cache of the file system.

* * * * *